United States Patent
Ishizuka

(10) Patent No.: US 9,131,088 B2
(45) Date of Patent: Sep. 8, 2015

(54) INFORMATION PROCESSING APPARATUS AND METHOD, AND INFORMATION PROCESSING PROGRAM

(75) Inventor: Kensaku Ishizuka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 914 days.

(21) Appl. No.: 12/871,579

(22) Filed: Aug. 30, 2010

(65) Prior Publication Data

US 2010/0325585 A1    Dec. 23, 2010

Related U.S. Application Data

(63) Continuation of application No. 10/148,827, filed as application No. PCT/JP01/08820 on Oct. 5, 2001, now Pat. No. 7,823,084.

(30) Foreign Application Priority Data

Oct. 6, 2000  (JP) ................................. 2000-308298

(51) Int. Cl.
  *G06F 3/00*  (2006.01)
  *H04N 1/00*  (2006.01)
  *G06F 3/14*  (2006.01)

(52) U.S. Cl.
  CPC .............. *H04N 1/00442* (2013.01); *G06F 3/14* (2013.01); *H04N 1/00204* (2013.01); *H04N 1/00244* (2013.01); *H04N 1/00408* (2013.01);
  (Continued)

(58) Field of Classification Search
  CPC .............................. G06F 3/0485; G06F 3/0481
  USPC ................... 715/853–854, 830, 838
  See application file for complete search history.

(56) References Cited

U.S. PATENT DOCUMENTS 5,471,619 A * 11/1995 Messina .................... 717/108
5,623,590 A *  4/1997 Becker et al. .............. 715/772
(Continued)

FOREIGN PATENT DOCUMENTS

JP    5-110991    4/1993
JP    5-219428    8/1993
(Continued)

OTHER PUBLICATIONS

Japanese Office Action issued Mar. 26, 2013, in Japan Patent Application No. 2011-243388 (with English translation).
(Continued)

*Primary Examiner* — Ryan Pitaro
(74) *Attorney, Agent, or Firm* — Oblon, McClelland, Maier & Neustadt, L.L.P.

(57) ABSTRACT

A note-type personal computer according to the present invention has an LCD for displaying information stored in an internal storage provided therein, and an external storage or an external picture server connected thereto, via the internet. And, operation for the information stored in the respective storages is performed by the user in the same procedure using operation units such as a keyboard, a touch pad, with indication on the LCD confirmed. When the information stored in the picture server is displayed, the LCD displays auxiliary information indicative of this notice. The LCD displays the auxiliary information using a different folder name, or displays the auxiliary information on the background of a display area of the LCD. So, the user can confirm contents on the internet easily without the need of performing complicated operations.

31 Claims, 8 Drawing Sheets

(52) U.S. Cl.
CPC ....... *H04N1/00416* (2013.01); *H04N 1/00424* (2013.01); *H04N 1/00427* (2013.01); *H04N 1/00429* (2013.01); *H04N 1/00432* (2013.01); *H04N 1/00453* (2013.01); *H04N 1/00461* (2013.01); *H04N 1/00472* (2013.01); *H04N 1/00474* (2013.01); *H04N 1/00482* (2013.01); *G09G 2340/14* (2013.01); *H04N 2201/001* (2013.01); *H04N 2201/0084* (2013.01)

(56) References Cited

U.S. PATENT DOCUMENTS

| | | | |
|---|---|---|---|
| 5,634,128 A * | 5/1997 | Messina | 719/316 |
| 5,724,532 A | 3/1998 | Thomson | |
| 5,742,285 A * | 4/1998 | Ueda | 715/778 |
| 5,838,916 A * | 11/1998 | Domenikos et al. | 709/219 |
| 5,864,868 A | 1/1999 | Contois | |
| 5,875,446 A * | 2/1999 | Brown et al. | 1/1 |
| 5,898,436 A * | 4/1999 | Stewart et al. | 345/594 |
| 5,977,971 A | 11/1999 | Guzak et al. | |
| 6,043,817 A * | 3/2000 | Bolnick et al. | 715/788 |
| 6,067,086 A | 5/2000 | Walsh | |
| 6,138,150 A | 10/2000 | Nichols et al. | |
| 6,148,377 A | 11/2000 | Carter et al. | |
| 6,175,863 B1 | 1/2001 | Belfiore et al. | |
| 6,226,672 B1 | 5/2001 | DeMartin et al. | |
| 6,237,010 B1 | 5/2001 | Hui et al. | |
| 6,246,410 B1 * | 6/2001 | Bergeron et al. | 715/854 |
| 6,248,946 B1 | 6/2001 | Dwek | |
| 6,292,204 B1 * | 9/2001 | Carleton et al. | 715/753 |
| 6,335,742 B1 * | 1/2002 | Takemoto | 715/781 |
| 6,380,957 B1 * | 4/2002 | Banning | 715/828 |
| 6,381,029 B1 | 4/2002 | Tipirneni | |
| 6,407,752 B1 * | 6/2002 | Harnett | 715/744 |
| 6,448,985 B1 | 9/2002 | McNally | |
| 6,526,424 B2 * | 2/2003 | Kanno et al. | 715/229 |
| 6,570,593 B1 | 5/2003 | Bowers et al. | |
| 6,583,799 B1 | 6/2003 | Manolis et al. | |
| 6,633,850 B1 | 10/2003 | Gabbard et al. | |
| 6,636,250 B1 | 10/2003 | Gasser | |
| 6,697,090 B1 | 2/2004 | Nagasaka et al. | |
| 6,732,623 B1 * | 5/2004 | Jennings | 83/436.2 |
| 6,735,623 B1 | 5/2004 | Prust | |
| 6,876,759 B2 | 4/2005 | Keller et al. | |
| 7,085,994 B2 * | 8/2006 | Gvily | 715/234 |
| 7,099,490 B1 | 8/2006 | Fujita et al. | |
| 7,107,516 B1 | 9/2006 | Anderson et al. | |
| 7,283,845 B2 * | 10/2007 | De Bast | 455/566 |
| 7,409,644 B2 | 8/2008 | Moore et al. | |
| 8,276,098 B2 * | 9/2012 | Fagans et al. | 715/811 |
| 2001/0000541 A1 | 4/2001 | Schreiber et al. | |
| 2001/0028363 A1 * | 10/2001 | Nomoto et al. | 345/748 |
| 2002/0032696 A1 * | 3/2002 | Takiguchi et al. | 707/500.1 |
| 2002/0044157 A1 * | 4/2002 | Wolf et al. | 345/700 |
| 2002/0097278 A1 | 7/2002 | Mandler et al. | |
| 2003/0033402 A1 | 2/2003 | Battat et al. | |
| 2004/0070608 A1 * | 4/2004 | Saka | 345/748 |
| 2004/0179115 A1 | 9/2004 | Tomat et al. | |
| 2004/0193594 A1 | 9/2004 | Moore et al. | |
| 2004/0220899 A1 | 11/2004 | Barney et al. | |
| 2013/0097566 A1 * | 4/2013 | Berglund | 715/863 |

FOREIGN PATENT DOCUMENTS

| | | |
|---|---|---|
| JP | 7-93369 | 4/1995 |
| JP | 7-306933 | 11/1995 |
| JP | 08-279982 | 10/1996 |
| JP | 9-312791 | 12/1997 |
| JP | 10-290419 | 10/1998 |
| JP | 11-261865 | 9/1999 |
| JP | 11-297044 | 10/1999 |
| JP | 11-355706 | 12/1999 |
| JP | 2000-083191 | 3/2000 |
| JP | 2000-227832 | 8/2000 |

OTHER PUBLICATIONS

Rikiichi Koizumi, NT Power Explosion I Road to Home Intranet, Operational Practice of Network . . . Utilization of Application in Standard Equipment, DOS/V magazine, Japan Softbank Corporation, Aug. 1, 1997, vol. 6, No. 15, pp. 265-272.

Digital Photo Manager [Picture Gear] PCQ-PG32, Japan , Sony Corporation, Apr. 1999, [online], Internet, [Retrieval on Mar. 21, 2013], <URL:http://www.vaio.sony.co.jp/software/PictureGear/image/PG32_cata.pd, 4 pages.

Office Action issued Nov. 7, 2011, in Japanese Patent Application No. 2011-243388.

* cited by examiner

INFORMATION PROCESSING APPARATUS AND METHOD, AND INFORMATION PROCESSING PROGRAM

CROSS-REFERENCE TO RELATED APPLICATIONS

This application is a continuation application of and claims the benefit of priority under 35 U.S.C. §120 of U.S. Ser. No. 10/148,827, filed Sep. 26, 2002, the entire contents of this application is incorporated herein by reference. U.S. Ser. No. 10/148,827, is a National Stage application of PCT/JP01/08820, filed Oct. 5, 2001, which claims the benefit of priority under 35 U.S.C. §119 from JP 2000-308298, filed Oct. 6, 2000.

TECHNICAL FIELD

The present invention related to an information processing apparatus which can have an access to an internal storage provided therein and an external storage connected thereto, an information processing method for displaying information stored in the internal storage and the external storage and processing the information, and an information processing program based on the information processing method.

BACKGROUND ART

Conventionally, when acquiring contents on the network, it is necessary to go through several steps of connecting a client computer to the network, searching for a desired place including the contents on the internet, downloading the contents, and confirming the contents, which steps require complicated operations.

DISCLOSURE OF THE INVENTION

Accordingly, the present invention has an object to overcome the above-mentioned drawbacks of the prior art by providing an information processing apparatus and method, and an information processing program, which enable the user to confirm the contents on the internet easily without the need of performing complicated operations.

The above object can be attained by providing an information processing apparatus which can have an access to an internal storage provided therein and to an external storage connected thereto, including operation means, and display means for displaying information stored in the internal storage and the external storage, wherein operation for the information stored in the respective storages is performed in the same procedure using the operation means with indication on the display means confirmed.

Also, the above object can be attained by providing an information processing method for displaying information stored in an internal storage provided in an information processing apparatus and in an external storage connected to the apparatus on display means, and processing the information using operation means including connection step of making a communication connection to the external storage, selection step of selecting the information stored in the external storage, whose communication connection with the information processing apparatus is secured by way of the connection step, on displaying the information on the display means and using the operation means, similar to the operation for displaying the information stored in the internal storage, and information acquisition step of acquiring information selected from the external storage in the selection step.

Also, the above object can be attained by providing an information processing program for displaying information stored in an internal storage provided in an information processing apparatus and in an external storage connected to the apparatus on display means, and processing the information using operation means including connection step of making a communication connection to the external storage, selection step of selecting the information stored in the external storage, whose communication connection with the information processing apparatus is secured by way of the connection step, on displaying the information on the display means and using the operation means, similar to the operation for displaying the information stored in the internal storage, and information acquisition step of acquiring information selected from the external storage in the selection step.

BEST MODE FOR CARRYING OUT THE INVENTION

The present invention will further be described below concerning the best modes with reference to the accompanying drawings.

Figure 1:
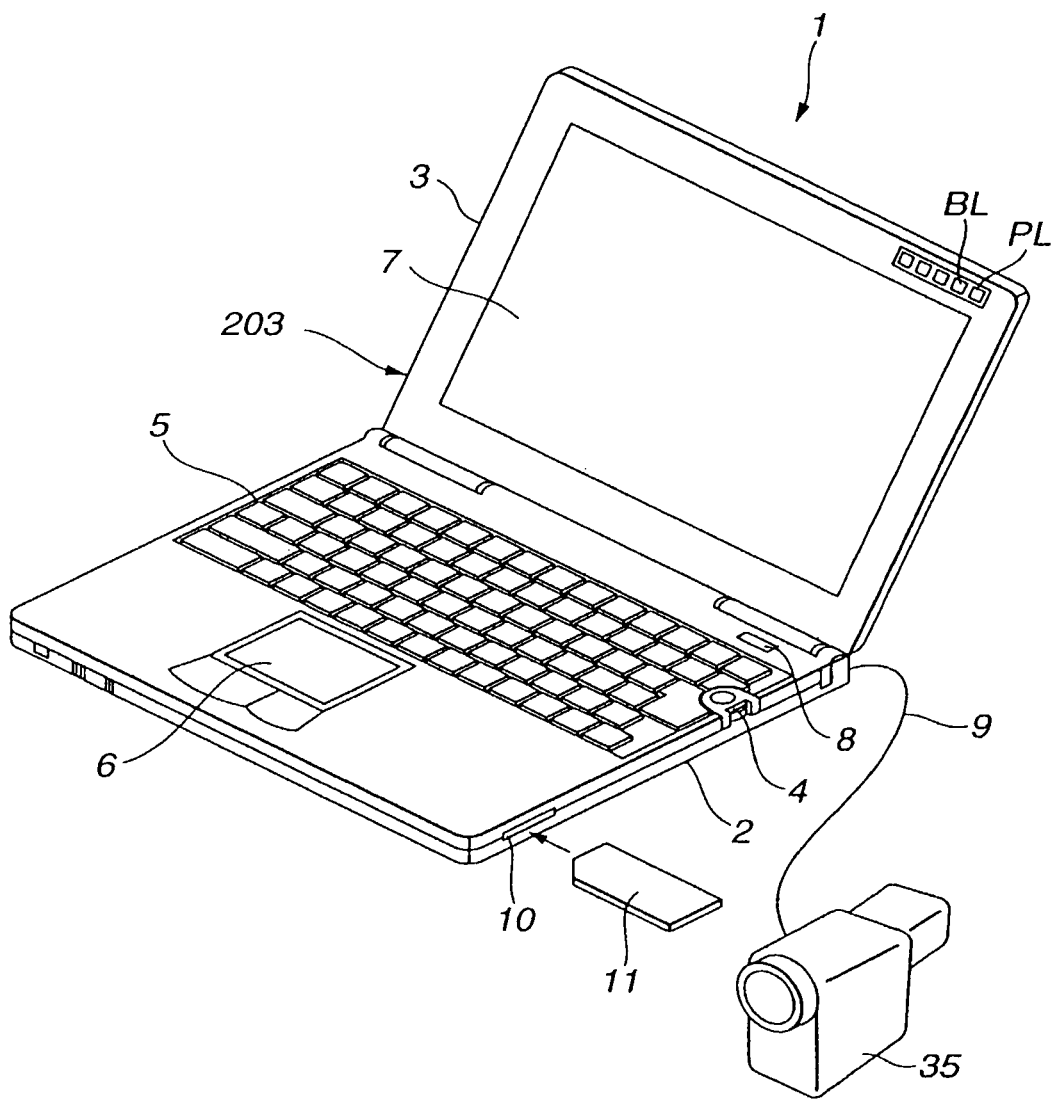
FIG. 1 shows a perspective view of a note-type personal computer employing the present invention.

FIG. 1 shows a perspective view of a note-type personal computer 1 employing the present invention, and a digital video camera 35 which is connected to the note-type personal computer 1 via an IEEE 1394 cable 9 conforming to the IEEE 1394 format.

The note-type personal computer 1 basically includes a main body 2, and a display unit 3 which can be folded to and unfolded from the main body 2. The note-type personal computer 1 shown in FIG. 1 has the display unit 3 unfolded from the main body 2.

The main body 2 has a jog dial 4, a keyboard 5 for inputting characters, symbols, numbers, etc., a touch pad 6 used as a pointing device for moving a mouse cursor displayed on a display screen etc., and a power switch 8, which are arranged on the top surface of the main body 2. On the other hand, a mouse, not shown, is often used as a pointing device, which could be connected to the main body 2. The mouse, similar to the touch pad 6, is adopted for operating a mouse cursor etc. Also, a mouse wheel, not shown, is often used as a pointing device, which could be connected to the main body 2.

The display unit 3 has an LCD (Liquid Crystal Display) 7 for displaying pictures on the front surface thereof. Furthermore, the display unit 3 has a power lamp PL, a battery lamp BL, a message lamp ML if necessary, and other lamps, which are LEDs, on the right upward portion thereof.

The jog dial 4 is arranged on the right upward portion of the keyboard 5 such that the lateral portion thereof protrudes from the right side of the main body 2. Also, the main body 2 is provided with a PC card slot, a memory card slot, etc. on the right side thereof. The memory card slot has a semiconductor memory such as a flush memory built therein, and has a memory card such as a memory stick (registered trade mark) which stores still picture data, moving picture data, speech data, text data, programs, etc. installed thereto.

The note-type personal computer 1 has an IEEE 1394 terminal arranged on the rear side of the main body 2, and the digital video camera 35 is connected to the IEEE 1394 terminal via the IEEE 1394 cable 9. The note-type personal computer 1 can take in or receive video data from the digital video camera 35 as moving picture data and still picture data by executing application software for taking in video data of moving picture data and still picture data. The note-type personal computer 1 can take in video data which has been already shot, and can also take in that of camera-through directly.

Furthermore, the note-type personal computer 1 can take in still picture data which is shot by a digital still camera or a digital video camera using a memory stick.

The note-type personal computer 1 concentratively manages moving picture data and still picture data stored in various removable media or storages such as a hard disc, floppy disk, MO, PC card, and other card-shaped memories by executing application software for picture viewer & picture reformation processing.

Also, the note-type personal computer 1 concentratively manages moving picture data and still picture data stored in a storage of a picture server etc. which is connected via the network by executing application software for picture viewer & picture reformation processing.

Specifically, the note-type personal computer 1 reads out the application software for picture viewer & picture reformation processing from a program storage media such as a CD-ROM, HDD into a RAM, and causes the application software to be executed by a central processing unit (CPU).

Figure 2:
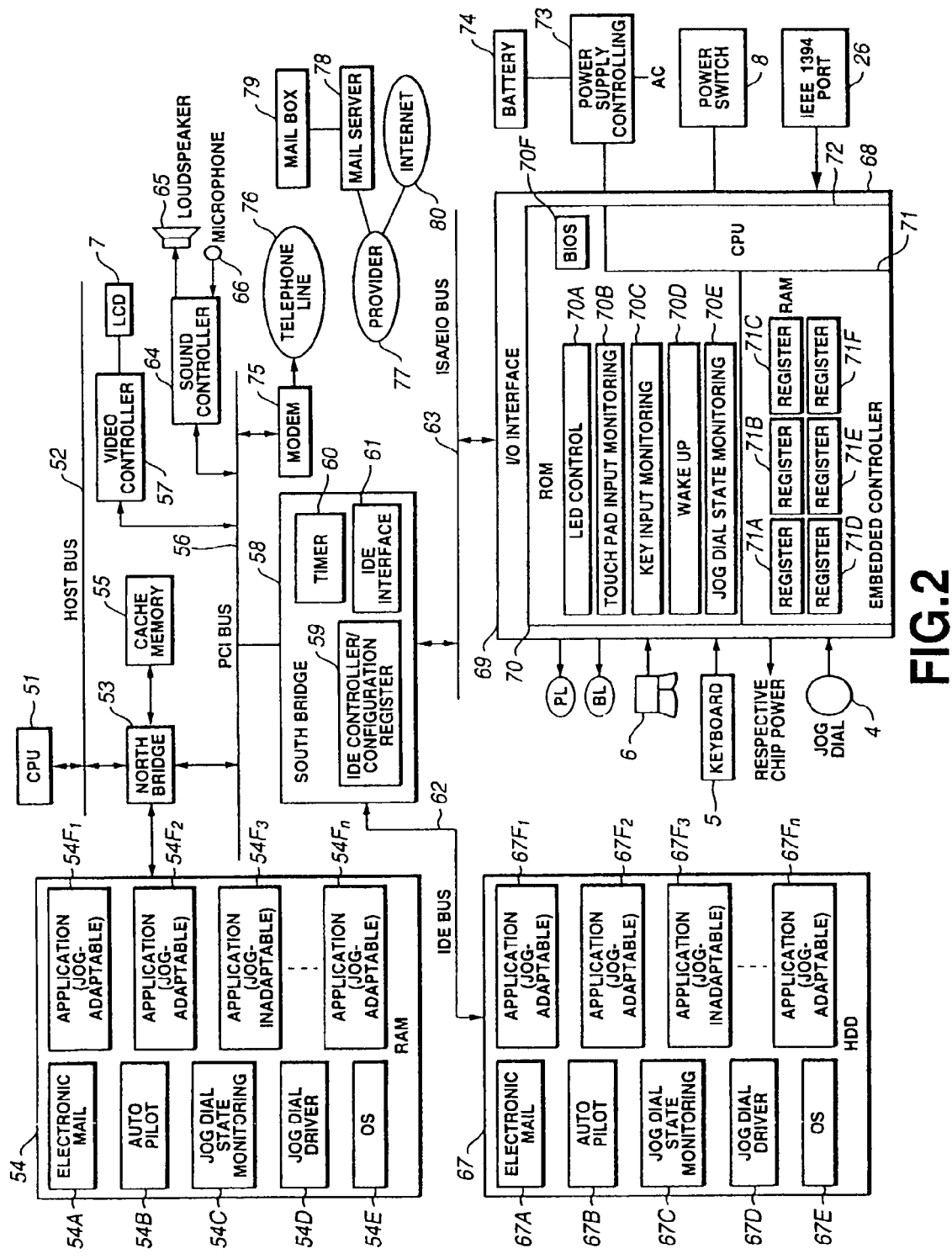
FIG. 2 shows a block diagram of the note-type personal computer.

At first, the electrical configuration of the note-type personal computer 1 will be explained with reference to FIG. 2. A CPU 51 such as a Pentium (registered trade mark) processor manufactured by Intel Corporation is connected to a host bus 52. A north bridge 53 is connected to the host bus 52, and the north bridge 53 is connected also to a PCI bus 56. The north bridge 53 such as a 400BX manufactured by Intel Corporation controls the CPU 51 and the periphery of a main memory 54. The north bridge 53 and a south bridge 58, to be described later, jointly form a chip set.

The north bridge 53 is connected also to the main memory 54 and a cache memory 55. The cache memory 55 caches data to be used by the CPU 51. The CPU 51 also has a primary cache memory, not shown, built therein.

The main memory 54 such as a DRAM (Dynamic Read Only Memory) stores programs to be executed by the CPU 51 and data necessary for operating the CPU 51. Specifically, when the initiation (boot up) of the main memory 54 is completed, an HDD 67 transfers an electronic mail program 54A, an auto pilot program 54B, a jog dial state monitoring program 54C, a jog dial driver 54D, an operating program (OS) 54E, other application programs $54F_1$~$54F_n$, etc. to the main memory 54, and the main memory 54 receives and stores these programs. The application program $54F_1$ is the application software for picture viewer & picture reformation processing, hereinafter.

The electronic mail program 54A is a program for sending and receiving communication messages from a communication line such as a telephone line 76 via a modem 75, to be described later, by means of the internet. The electronic mail program 54A has the function of delivered mail acquisition. Under the delivered mail acquisition function, the user inquires of a mail server 78 owned by an internet service provider 77 whether a mail box 79 has received mails directed to the user, and acquires mails in case there are such mails.

The auto pilot program 54B sequentially initiates preset plural items of precessing (or plural programs) in a preset order, and executes the processing or programs.

The OS (basic program software) 54E such as Windows 95 and 98 (both registered trade mark) manufactured by Microsoft Corporation, Mac OS (registered trade mark) manufactured by Apple Computer Inc. etc. controls basic operation of a computer.

The jog dial state monitoring program 54C receives information of jog dial adaptability from the respective applications, and in case the application is jog-dial-adaptable, the jog dial state monitoring program 54C displays what can be performed on operating the jog dial 4. Normally, the jog dial state monitoring program 54C is in the state of waiting for the event of the jog dial 4, and has a list of information to be received from the applications. The jog dial driver 54D performs various functions corresponding to the operation of the jog dial 4.

As the application software for picture viewer & picture reformation processing referred to as the application program $54F_1$, Picture Gear (registered trade mark) can be exemplified, specifically. The Picture Gear is software which can concentratively manages moving picture data and still picture data stored in various removable media such as a hard disc, floppy disk, MO, PC card, and other card-shaped memories. Respective pictures can be displayed in a list by a predetermined operation, which enables the user to visually find out a subject picture. By performing picture reformation processing, a panoramic picture of 360 degrees and a label having a photo can be formed. Furthermore, an HTML album whose pictures can be seen by means of a WWW browser can also be formed. The details will be described later.

A video controller 57 is connected to the PCI bus 56, and controls the displaying operation of the LCD 7 arranged on the display unit 3 based on data supplied via the PCI bus 56.

A sound controller 64 is connected to the PCI bus 56, which receives audio signals from a microphone 66 and send audio signals to a speaker 65. A modem 75 is also connected to the PCI bus 56. The modem 75 can be connected to a communication network such as the internet 80 and the mail server 78 via the telephone line 76 and internet service provider 77.

The south bridge 58 is also connected to the PCI bus 56. The south bridge 58 such as a PIIX4E manufactured by Intel Corporation controls various I/O (Input/Output). That is, the south bridge 58 is composed of an IDE (Integrated Drive Electronics) controller/configuration register 59, a timer circuit 60, and an IDE interface 61, which controls devices connected to an IDE bus 62, devices connected to an ISA/EIO (Industry Standard Architecture/Extended Input Output) bus 63, and devices connected to an embedded controller 68.

The IDE controller/configuration register 59 is composed of two IDE controllers or a primary IDE controller and a secondary IDE controller, a configuration register, etc. not shown.

The primary IDE controller is connected to a connecter, not shown, via the IDE bus 62, and the HDD 67 is connected to the connecter. Also, the secondary IDE controller is connected to bay devices as IDE devices such as a CD-ROM drive, a second HDD, an FDD, not shown, via another IDE bus, etc. When such bay devices are connected to the secondary IDE controller, connecters of the bay devices are electrically connected to the secondary IDE controller.

The HDD 67 stores an electronic mail program 67A, an auto pilot program 67B, a jog dial state monitoring program 67C, a jog dial driver 67D, an OS (basic program software) 67E, other application programs $67F_1 \sim 67F_n$, etc. in advance. The application program $67F_1$ is the application software for picture viewer & picture reformation processing such as the Picture Gear. Thus, the HDD 67 is a specific example of a program storage medium according to the present invention.

The respective programs 67A, 67B, 67C, 67D, 67E, $67F_1 \sim 67F_n$, in the HDD 67 are sequentially transferred to the main memory 54 in the initiation (boot up) processing, and the programs are temporarily stored in the main memory 54 as the electronic mail program 54A, an auto pilot program 54B, a jog dial state monitoring program 54C, a jog dial driver 54D, an operating program (OS) 54E, other application programs $54F_1 \sim 54F_n$, etc.

The embedded controller 68 is also connected to the ISA/EIO bus 63. The embedded controller 68 is a micro controller, and is used as an I/O controller. That is, an I/O interface 69, a ROM 70, a RAM 71, a CPU 72 are mutually connected to each other to configure the embedded controller 68.

An LED control program 70A, a touch pad input monitoring program 70B, a key input monitoring program 70C, a wake up program 70D, a jog dial state monitoring program 70E are stored in the ROM 70.

The LED control program 70A is a program for controlling the lighting of the power lamp PL, battery lamp BL, message lamp ML if necessary, and other lamps, which are LEDs. The touch pad input monitoring program 70B is a program for monitoring input operation by the user from the touch pad 6. The key input monitoring program 70C is a program for monitoring input operation by the user from the keyboard 5 and other key switches. The wake up program 70D is a program for checking the current time data supplied from the timer circuit 60 in the south bridge 58 with the preset time, and managing respective chip power supplies so as to initiate predetermined processing (or programs) when the current time corresponds with the preset time.

The jog dial state monitoring program 70E is a program for monitoring the state of the jog dial 4, and checks if the jog dial 4 is rotated or pressed.

The ROM 70 stores a BIOS (Basic Input/Output System) 70F. The BIOS is a basic input/output system, and is a software program for controlling data receiving/sending (input/output) among the OS, application software, peripheral devices (display, keyboard, HDD, etc.)

A RAM 71 has registers 71A~71F for LED controlling, touch pad input status, key input status, time setting up, jog dial state monitoring, etc. For example, an LED controlling register 71A controls the lighting of the message lamp ML, to be described later, for indicating the instant rising state of an electronic mail after the jog dial 4 is pressed. A key input status register 71C stores an operation key flag when the jog dial 4 is pressed for one-touch operation, to be described later. A time setting up register 71D can set up the time arbitrarily.

Furthermore, the jog dial 4, touch pad 6, keyboard 5 are connected to the embedded controller 68 via connecters, not shown. The embedded controller 68 sends signals corresponding to the respective operations of the jog dial 4, touch pad 6, keyboard 5 to the ISA/EIO bus 63. Also, the power lamp PL, battery lamp BL, message lamp ML, and other lamps, which are LEDs, are connected to the embedded controller 68.

Furthermore, a power supply controlling circuit 73 is connected to the embedded controller 68. The power supply controlling circuit 73 is connected to a built-in battery 74 or an AC power supply, which supplies necessary power to respective units, and controls charging of the built-in battery 74 and second batteries of peripheral devices. Also, the embedded controller 68 monitors a power switch 8 which is operated when the power is turned on or off.

Furthermore, an IEEE 1394 port 26 is connected to the embedded controller 68. So, the note-type personal computer 1 can receive video data from the digital video camera 35 via the IEEE 1394 cable 9 which is connected to the IEEE 1394 port 26.

Next, the configuration of a picture viewer & picture reformation processing system which consists of the note-type personal computer 1, internet 80, and a picture server 100 will be explained with reference to FIG. 3.

One example of the picture server 100 is a server for use in Image Station (trade mark) which was established as an image sharing service.

The Image Station is a new network service using moving pictures and still pictures. The user can preserve moving pictures and still pictures in an album by having an access to the site of the Image Station to perform member registration, and uploading the moving picture data and still picture data of the user from his personal computer. The user can see thus preserved pictures, and can send the picture data from his personal computer. Also, the user can make the album public, and can upload the picture data to an album which is owned jointly by users having the same hobby or taste. Thus, the network service can be used for communication among such users.

Conventionally, when uploading picture data to the internet, the user is required to have the knowledge of processing concerning the Web site construction and the network construction. On the other hand, when the Image Station employs the information processing apparatus and method according to the present invention, the user can upload picture data on desktop of his personal computer by relocating the picture into an icon for drag-and-drop in the site of the Image Station. Furthermore, downloading can be performed by simple processing.

On the other hand, what is connected to the note-type personal computer 1 is not limited to the picture server 100, and an HDD of large capacity or another storage such as a recording medium can be connected to the note-type personal computer 1.

The note-type personal computer 1 has the LCD 7 for displaying information stored in an internal storage provided therein, and an external storage or the external picture server 100 connected thereto, via the internet 80. And, operation for the information stored in the respective storages is performed by the user in the same procedure using operation units such as the keyboard 5, touch pad 6, with indication on the LCD 7 confirmed.

When the information stored in the picture server 100 is displayed, the LCD 7 displays auxiliary information indicative of this notice. The LCD 7 displays the auxiliary information using a different folder name, or displays the auxiliary information on the background of a display area of the LCD 7.

Figure 3:
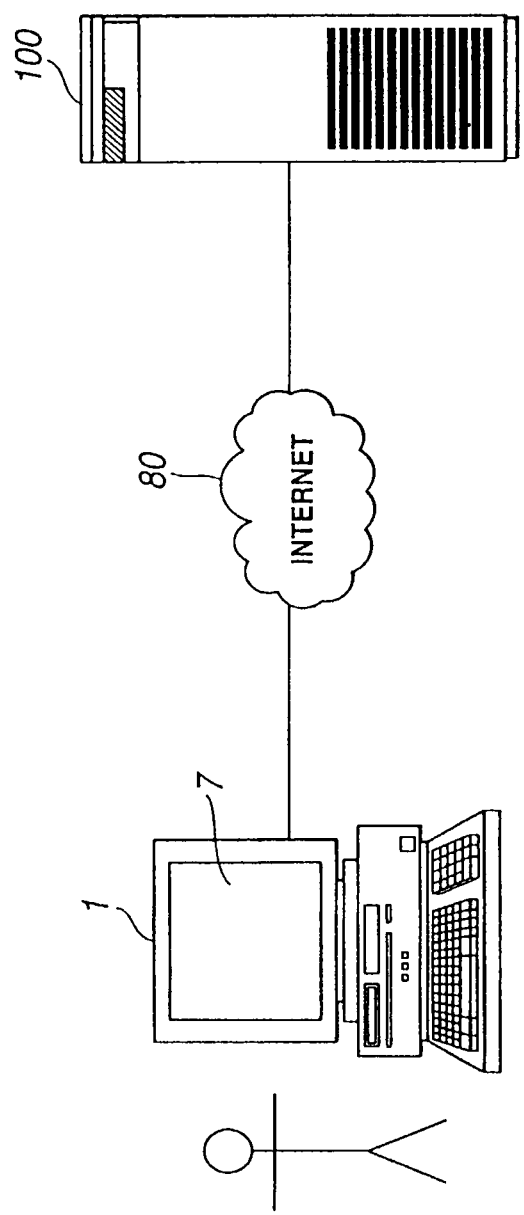
FIG. 3 shows an information processing system which consists of the note-type personal computer, internet, and a picture server.
Figure 4:
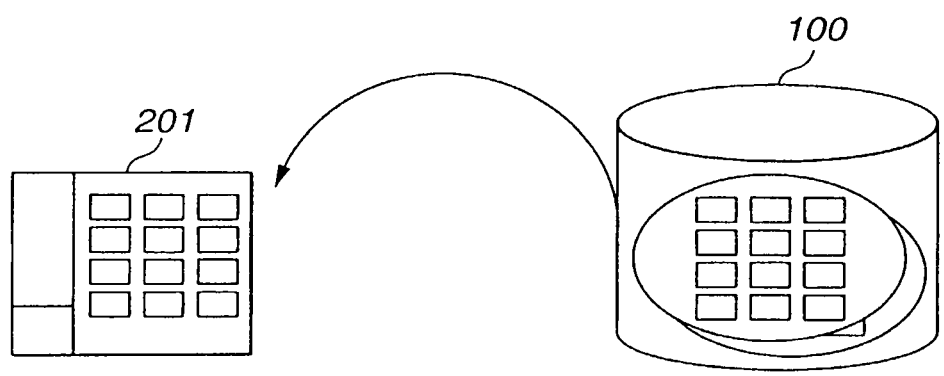
FIG. 4 shows the state in which a Picture Gear window displayed on a LCD of the note-type personal computer displays information concerning contents sent from the picture server.

In the picture viewer & picture reformation processing system shown in FIG. 3, a Picture Gear window 201 displayed on the LCD 7 of the note-type personal computer 1 (local computer) displays information concerning the contents stored in the internal storage of the note-type personal computer 1, and other information concerning the contents sent from the picture server 100, as shown in FIG. 4. In this way, the picture viewer & picture reformation processing system can display multi-media contents via the internet such as picture information in a simplified manner without troubling or burdening the user, similar to the operation for displaying picture information stored in the internal storage.

Figure 5:
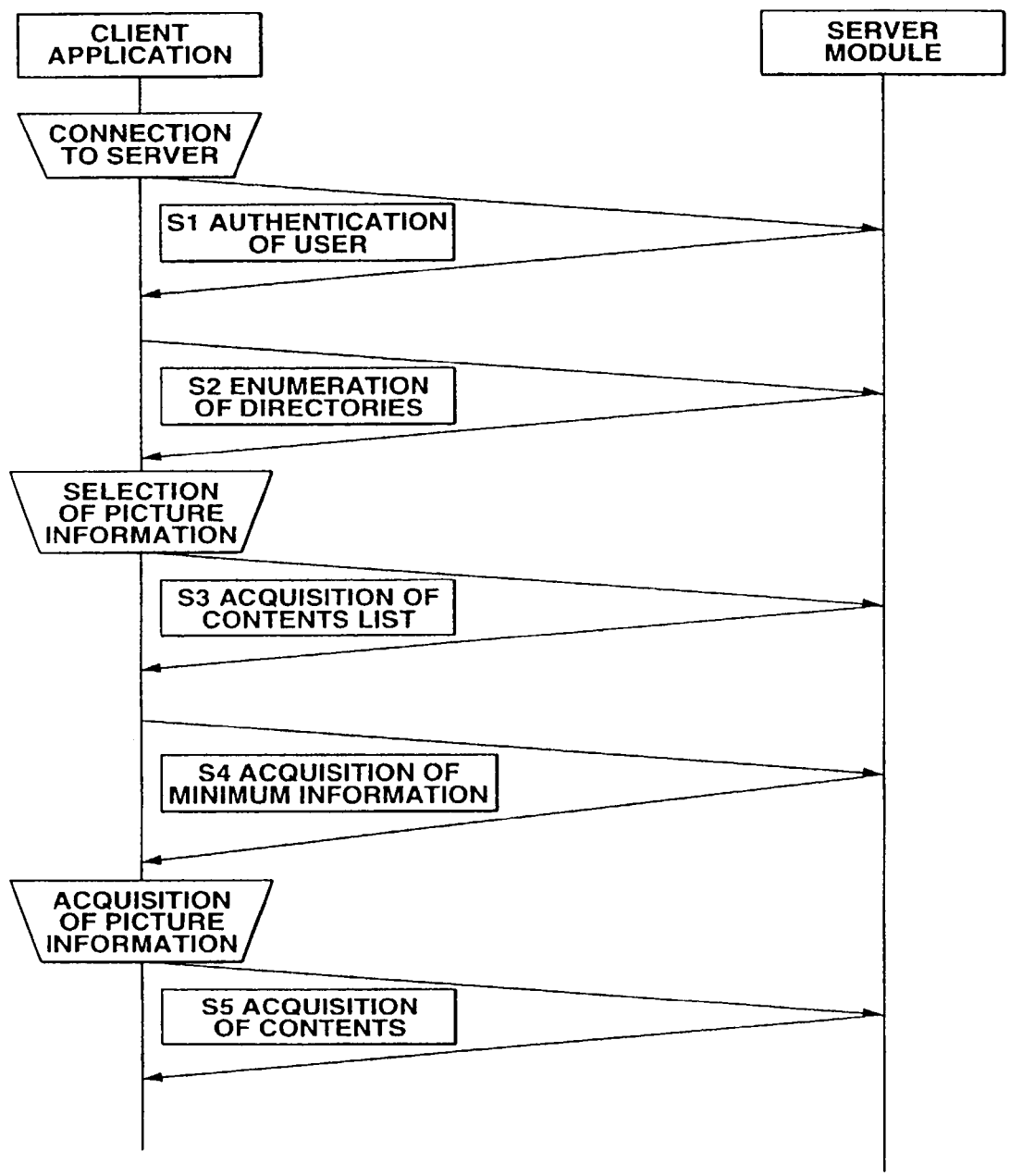
FIG. 5 shows a flow chart of an operation for acquiring contents on a network of the information processing system.

Next, an operation for acquiring contents on a network of an information processing system such as the picture viewer & picture reformation processing system will be explained with reference to FIG. 5. In FIG. 5, the application software for picture viewer & picture reformation processing is shown as client application software, while the picture server 100 is shown as server module.

The client application software includes connection step of making a communication connection to the picture server 100 connected to the note-type personal computer 1 via the internet 80, selection step of selecting picture information stored in the picture server 100, whose communication connection with the note-type personal computer 1 is secured by way of the connection step, by displaying the information on the LCD 7 and using the operation units, similar to the operation for displaying the picture information stored in the internal storage, and information acquisition step of acquiring picture information selected from the picture server 100 in the selection step.

Specific example of the connection step is authentication processing of the user in step S1, which step is to be described later. Specific examples of the selection step are processing for enumerating directories in step S2, processing for acquiring contents in step S3, and processing for acquiring minimum information in step S4, which steps are to be described later. Specific example of the information acquisition step is processing for acquiring contents in step S5.

First, in step S1, the note-type personal computer 1 performs authentication processing of the user by executing the client application software. In the following explanation, it is considered that the client application software is executed by the note-type personal computer 1. The authentication processing of the user is performed when the user sends account, password, etc. After the authentication processing is completed, the server module sends a message that the server module has authenticated the user to the client application software.

Next, the client application software executed by the note-type personal computer 1 requires the server module to send a directory list, or list of directories, thereto so as to find a place (referred to as directory, hereinafter) where contents peculiar to the user or contents owned jointly by a specific group. Responding to the request, the server module sends a directory list to the client application software. Then, in step S2, the client application software displays the directory list and enumerates directories to the user, and makes the user select a directory whose contents the user wants to confirm. At this time, the client application software concurrently displays a directory list concerning the contents stored in the internal storage on a presentation area 202 for presenting directories, to be described later.

Figure 6:
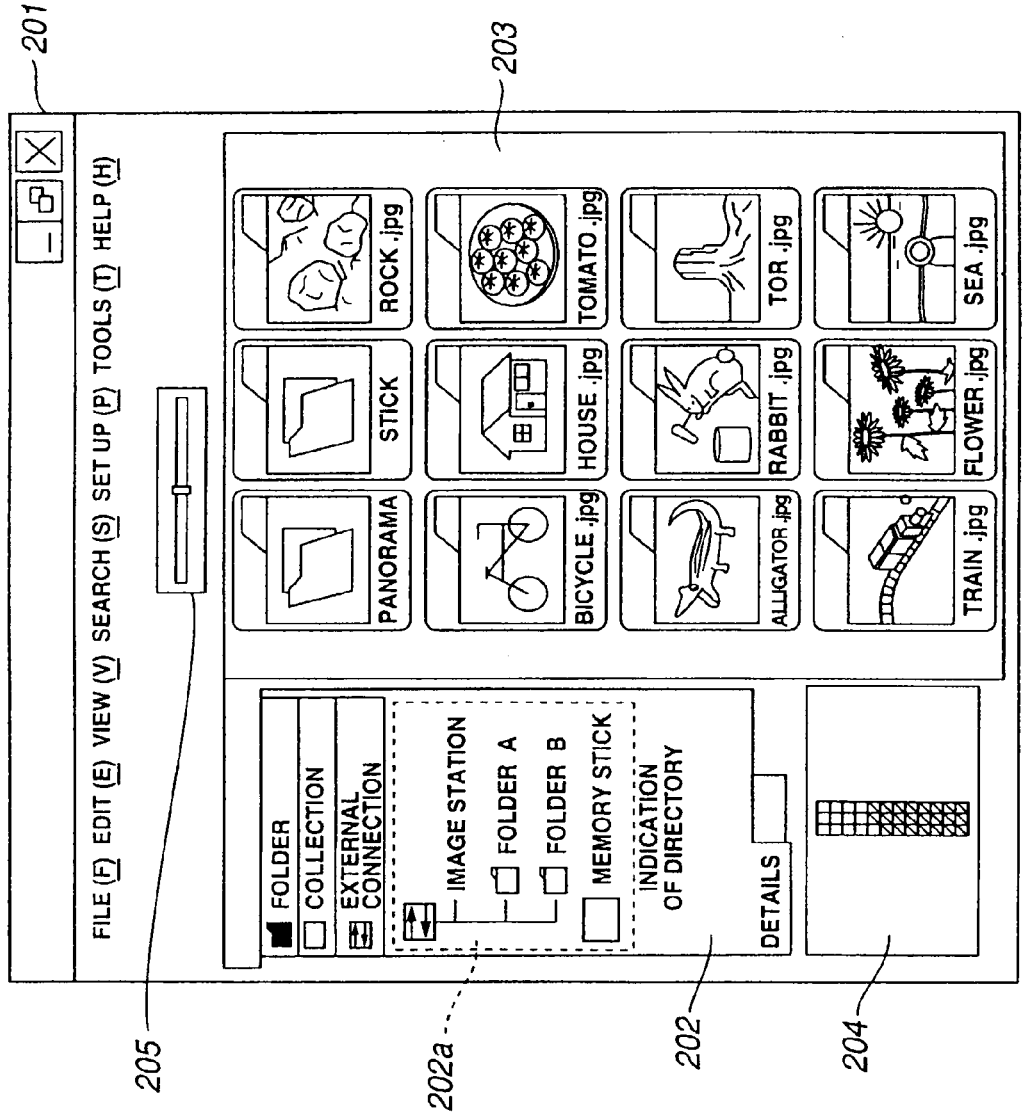
FIG. 6 shows a specific example of directories, from which the user selects one directory, and confirms the contents thereof.

FIG. 6 shows a specific example of directories, from which the user selects one directory, and confirms the contents thereof. The Picture Gear window 201 is composed of the presentation area 202 for presenting directories, a picture display area 203, and another picture display area 204, in which pictures are displayed with their sizes highly reduced. The picture display area 203 displays many zoomed pictures of arbitrary size in the form of a list (sheet view displaying). When displaying all the pictures, picture display area 204 with high reduction degree can be used. Only one picture selected from the sheet-view-displayed pictures can be displayed on the picture display area 203. Sizes of pictures in the picture display area 203 and the picture display area 204 can be expanded/reduced by a slide operation unit 205 with a gage for zoom in/out operation. A picture, or pictures which are sheet-view-displayed in the form of a list can be zoomed in/out with high speed in the range, for example, from 12.5% to 800%.

In the presentation area 202, so as to definitely distinguish a folder in the internal storage of the note-type personal computer 1 from that in the external storage or server module connected to the note-type personal computer 1 via the internet, the internal folder is shown simply as "folder", while the external folder is shown as "external connection". In FIG. 6, contents in the internal "folder" are displayed on the picture display area 203. In case of selecting the "external connection", the user is required to select desired folder (folder A or folder B) from a detailed presentation area 202a for the external folders.

When the folder B is selected, the client application software requires the server module to send a contents list, or list of contents, thereto, which exists in the directory of the folder B. When the server module sends a contents list responding to the request, in step S3, the client application software can acquire the contents list.

Then, in step S4, the client application software requires the server module to send part of all the respective contents acquired in the step S3 thereto so as to acquire minimum information of the contents. Responding to the request, the server module sends part of the respective contents. The minimum information is thumbnails of pictures or one frame of moving pictures.

Figure 7:
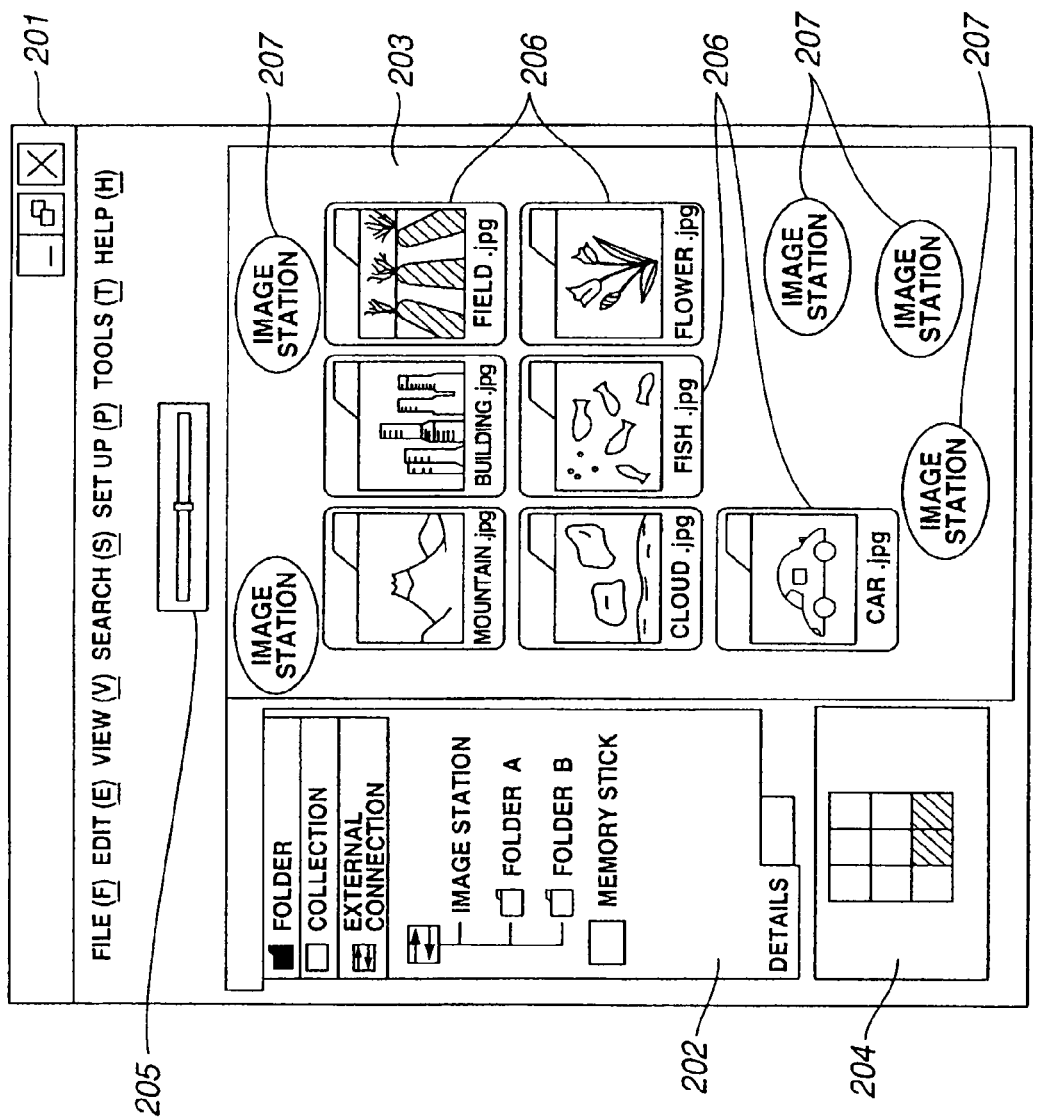
FIG. 7 shows thumbnail pictures displayed on a picture display area by a client application software.

FIG. 7 shows thumbnail pictures 206 displayed on the picture display area 203 by the client application software. By taking a look at the thumbnail pictures 206, the user can grasp the contents before acquiring the contents, which enables the user to obtain the standard for judgement to select necessary data. This processing is performed actively by the application software without the user's operation. Thus, the user can grasp the contents by only selecting a directory in which the contents exist. At this time, the picture display area 203 displays auxiliary information 207 indicative of the Image Station on the background of the thumbnail pictures 206. This intends to distinguish the displaying manner for pictures of the internal storage from that for pictures of the Image Station, which displaying manners are similar to each other.

When the client application software acquires the minimum contents information in step S4 and displays the thumbnail pictures 206 on the picture display area 203, and the user decides to acquire picture data after taking a look at the thumbnail pictures 206, then in step S5, the application software requests the server module to send contents of the picture data thereto corresponding to the operation of the user. Then, the client application software acquires all the contents in case the contents are sent from the server module. This operation is similar to that for acquiring contents stored in the internal storage of the local computer. This operation means copying files, displaying pictures, etc.

Next, an operation for sending contents to the network of the information processing system will be explained with reference to FIG. 8. As shown, there are performed authentication processing of the user in step S11, processing for enumerating directories in step S12, processing for acquiring contents in step S13, and processing for acquiring minimum information in step S14, which processing steps are similar to those of step S1 to step S4 shown in FIG. 5.

Then in step S15, the client application software transfers contents stored in the local computer (note-type personal computer 1) of the user to the server module. This operation is similar to that for processing contents stored in the internal storage of the local computer. That is, specifically, pasting files, drag-and-drop operation, etc. In more detail, the user opens local folders stored in the internal storage on the presentation area 202 of a directory in the Picture Gear window 201 shown in FIG. 6, and displays contents pictures on the picture display area 203. Then, the user select desired picture from the contents pictures, and performs drag-and-drop operation for the selected picture to relocate the picture into a folder of the Image Station presented on the presentation area 202.

According to the note-type personal computer 1 incorporated into the picture viewer & picture reformation processing system, contents which actually do not exist in the personal computer can be presented to the user as if the contents exist in his personal computer. Thus, the user can deal with contents on the network in a manner similar to that for dealing with contents in a local computer which the user is accustomed to using. So, user interface (UI) can be unified, which can reduce operations that the user have to learn.

Figure 8:
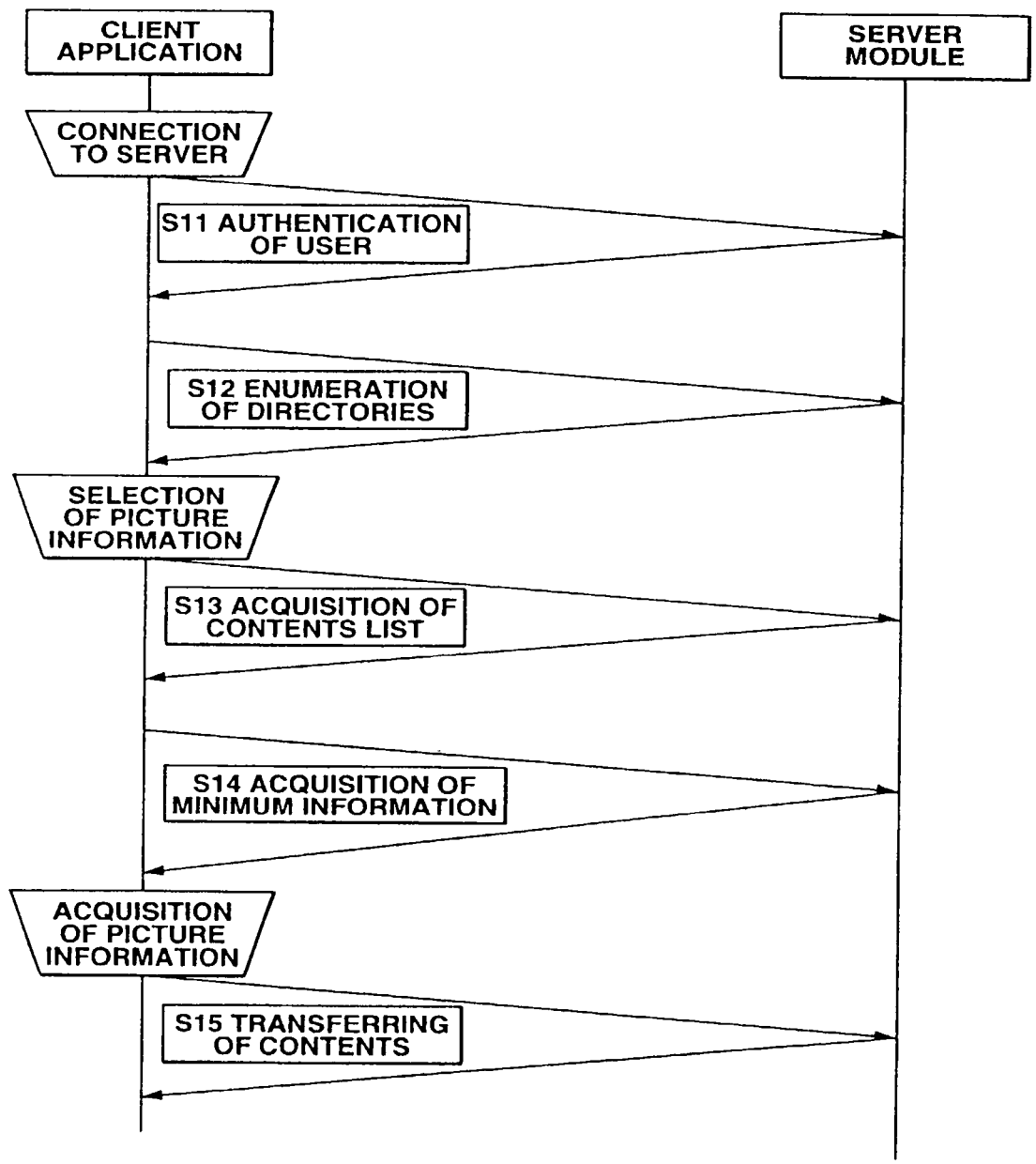
FIG. 8 shows a flow chart of an operation for sending contents to the network of the information processing system.

The note-type personal computer 1 reads out the application software for picture viewer & picture reformation processing shown in FIG. 5 and FIG. 8 from a program storage media such as an HDD, and causes the application software to be executed by a CPU. When a picture viewer & picture reformation processing apparatus is configured by using only hardware, the apparatus becomes complicated and enlarged in size. So, the configuration of the hardware of the note-type personal computer 1 can be simplified.

As in the above, the picture viewer & picture reformation processing system processes picture information such as moving pictures and still pictures. On the other hand, as the information, music information and text information is possible.

For example, when processing music information, in step S4 shown in FIG. 5, title names and artist names of the music information may be displayed, or intro of a few seconds may be played.

INDUSTRIAL APPLICABILITY

As in the above, the information processing apparatus and method, and information processing program according to the present invention enable the user to confirm the contents on the internet easily without the need of performing complicated operations.

The invention claimed is:

1. An information processing apparatus, comprising:
an internal storage memory having internal image files stored therein;
a communications unit implemented by circuitry configured to connect to an external server separated from the information processing apparatus by a network, the external server having external image files which are uploaded by a user and stored therein and realizing an image storing service;
a retrieving unit implemented by the circuitry configured to retrieve internal directory information for the internal image files and external directory information for the external image files; and
a display control unit implemented by the circuitry configured to
control display of a directory display area, a contents display area, and another contents display area in a single window,
control display (i) in the directory display area, of both an internal directory listing corresponding to the internal directory information for the internal image files and an external directory listing corresponding to the external directory information for the external image files, and (ii) in the contents display area, thumbnail images corresponding to either internal image files or external image files in accordance with user selection of the internal or external directory listing in the directory display area,
control display (iii) in the another contents display area, of thumbnail images corresponding to one of internal image files and external image files, the another contents display area being displayed adjacent to the contents display area and displaying a greater number of thumbnail images than are displayed in the contents display area, and sizes of the thumbnail images in the contents display area being different from sizes of the thumbnail images in the another contents display area, and
control display (iv) in the single window, of a slide operation unit to adjust the sizes of both the thumbnail images displayed in the contents display area and the thumbnail images displayed in the another contents display area by a slide operation,
wherein both internal directory listing and external directory listing continue to be displayed while the thumbnail images are displayed in the contents display area.

2. The apparatus according to claim 1, wherein the retrieving unit is implemented by the circuitry further configured to retrieve the internal image files and the external image files.

3. The apparatus according to claim 1, wherein the external directory information includes graphic information notifying the user that the directory information is for external contents.

4. The apparatus according to claim 1, wherein the internal and external directory information include information respectively identifying existence and location of internal and external image files respectively stored in the internal storage memory and the external server.

5. The apparatus according to claim 1, wherein
the retrieving unit retrieves the external directory information after transmission of user account and password information to the external server, and
the user account and password information transmitted to the external server provides access to the image sharing service.

6. The apparatus according to claim 1, wherein the thumbnail images displayed in the another contents display area correspond to the one of internal image files and external image files in accordance with user selection of said internal or external directory information in said directory display area,
and
the sizes of the thumbnail images in the another contents display area is smaller compared with the sizes of the thumbnail images in the contents display area.

7. The apparatus according to claim 1, further comprising:
a communications interface or a memory card slot, wherein the internal image files are imported from a digital camera connected to the information processing apparatus via the communications interface or a memory card inserted into the memory card slot.

8. The apparatus according to claim 1, wherein the display control unit implemented by the circuitry is configured to display the slide operation unit in the single window adjacent to at least a portion of the contents display area.

9. The apparatus according to claim 1, wherein the slide operation unit is configured to gradually adjust the sizes of the thumbnail images displayed in the contents display area.

10. The apparatus according to claim 1, wherein the slide operation unit has a slide bar shape.

11. The apparatus according to claim 1, wherein
additional information is displayed only in the contents display area, without being displayed in the another contents display area, so as to distinguish between internal image files and external image files, and
the additional information is displayed as icons on a background of the thumbnail images in the contents display area.

12. An information processing method implemented by an information processing apparatus, comprising:
storing internal image files in an internal storage memory of the information processing apparatus;
connecting to an external server separated from the information processing apparatus by a network, the external server having external image files which are uploaded by a user and stored therein and realizing an image storing service;
retrieving internal directory information for the internal image files and external directory information for the external image files;
displaying a directory display area a contents display area, and another contents display area in a single window;
displaying in the directory display area, both an internal directory listing corresponding to the internal directory information for the internal image files and an external directory listing corresponding to the external directory information for the external image files;
displaying in the contents display area, thumbnail images corresponding to either internal image files or external image files in accordance with user selection of the internal or external directory listing in the directory display area;
displaying in the another contents display area, thumbnail images corresponding to one of internal image files and external image files, the another contents display area being displayed adjacent to the contents display area and displaying a greater number of thumbnail images than are displayed in the contents display area, and sizes of the thumbnail images in the contents display area being different from sizes of the thumbnail images in the another contents display area; and
displaying in the single window, a slide operation unit to adjust the sizes of both the thumbnail images displayed in the contents display area and the thumbnail images displayed in the another contents display area by a slide operation,
wherein both internal directory listing and external directory listing continue to be displayed while the thumbnail images are displayed in the contents display.

13. The method according to claim 12, wherein the retrieving further comprises retrieving the internal image files and the external image files.

14. The method according to claim 12, wherein the external directory information includes graphic information notifying the user that the directory information is for external contents.

15. The method according to claim 12, wherein the internal and external directory information include information respectively identifying existence and location of internal and external image files respectively stored in the internal storage memory and the external server.

16. The method according to claim 12, wherein
the retrieving retrieves the external directory information after transmission of user account and password information to the external server, and
the user account and password information transmitted to the external server provides access to the image sharing service.

17. The method according to claim 12,
wherein the thumbnail images displayed in the another contents display area correspond to the one of internal image files and external image files in accordance with user selection of said internal or external directory information in said directory display area,
and
the sizes of the thumbnail images in the another contents display area is smaller compared with the sizes of the thumbnail images in the contents display area.

18. The method according to claim 12, wherein the displaying in the single window displays the slide operation unit in the single window adjacent to at least a portion of the contents display area.

19. The method according to claim 12, further comprising:
receiving, via the slide operation unit, an input to gradually adjust the sizes of the thumbnail images displayed in the contents display area.

20. The method according to claim 12, wherein the slide operation unit has a slide bar shape.

21. A non-transitory computer readable medium having stored thereon a program that when executed by a computer causes the computer to implement the information processing method according to claim 12.

22. An information processing apparatus, comprising:
internal storage means for storing internal image files;
communications means for connecting to an external server separated from the information processing apparatus by a network, the external server having external image files which are uploaded by a user and stored therein and realizing an image storing service;
retrieving means for retrieving internal directory information for the internal image files and external directory information for the external image files; and
display control means for
displaying a directory display area, a contents display area, and another contents display area in a single window,
displaying (i) in the directory display area, both an internal directory listing corresponding to the internal directory information for the internal image files and an external directory listing corresponding to the external directory information for the external image files, and (ii) in the contents display area, thumbnail images corresponding to either internal image files or external image files in accordance with user selection of the internal or external directory listing in the directory display area,
displaying (iii) in the another contents display area, thumbnail images corresponding to one of internal image files and external image files, the another contents display area being displayed adjacent to the contents display area and displaying a greater number of thumbnail images than are displayed in the contents display area, and sizes of the thumbnail images in the contents display area being different from sizes of the thumbnail images in the another contents display area; and
displaying (iv) in the single window, a slide operation unit to adjust the sizes of both the thumbnail images displayed in the contents display area and the thumbnail images displayed in the another contents display area by a slide operation, wherein both internal directory listing and external directory listing continue to be displayed while the thumbnail images are displayed in the contents display area.

23. The apparatus according to claim 22, wherein
the retrieving means retrieves the external directory information after transmission of user account and password information to the external server, and
the user account and password information transmitted to the external server provides access to the image sharing service.

24. The apparatus according to claim 1, wherein auxiliary information is displayed in the contents display area so as to distinguish between internal image files and external image files.

25. The apparatus according to claim 24, wherein the auxiliary information is displayed on a background of the thumbnail images.

26. The apparatus according to claim 22, wherein the display control means displays the slide operation unit in the single window adjacent to at least a portion of the contents display area.

27. The apparatus according to claim 22, wherein the slide operation unit is configured to gradually adjust the sizes of the thumbnail images displayed in the contents display area.

28. The apparatus according to claim 22, wherein the slide operation unit has a slide bar shape.

29. An information processing apparatus, comprising:
circuitry configured to
store internal image files,
communicate with an external server separated from the information processing apparatus by a network, the external server having external image files which are uploaded by a user and stored therein and realizing an image storing service,
retrieve internal directory information for the internal image files and external directory information for the external image files,
control display of a directory display area a contents display area, and another contents display area in a single window,
control display (i) in the directory display area, of both an internal directory listing corresponding to the internal directory information for the internal image files and an external directory listing corresponding to the external directory information for the external image files, and (ii) in the contents display area, thumbnail images corresponding to either internal image files or external image files in accordance with user selection of the internal or external directory listing in the directory display area,
control display (iii) in the another contents display area, of thumbnail images corresponding to one of internal image files and external image files, the another contents display area being displayed adjacent to the contents display area and displaying a greater number of thumbnail images than are displayed in the contents display area, and sizes of the thumbnail images in the contents display area being different from sizes of the thumbnail images in the another contents display area, and
control display (iv) in the single window, of a slide operation unit to adjust the sizes of both the thumbnail images displayed in the contents display area and the thumbnail images displayed in the another contents display area by a slide operation,
wherein both internal directory listing and external directory listing continue to be displayed while the thumbnail images are displayed in the contents display area.

30. A method implemented by an information processing apparatus, comprising:
storing internal image files;
communicating with an external server separated from the information processing apparatus by a network, the external server having external image files which are uploaded by a user and stored therein and realizing an image storing service;
retrieving internal directory information for the internal image files and external directory information for the external image files;
controlling display of a directory display area, a contents display area, and another contents display area in a single window;
controlling display (i) in the directory display area, of both an internal directory listing corresponding to the internal directory information for the internal image files and an external directory listing corresponding to the external directory information for the external image files, and (ii) in the contents display area, thumbnail images corresponding to either internal image files or external image files in accordance with user selection of the internal or external directory listing in the directory display area;
controlling display (iii) in the another contents display area, of thumbnail images corresponding to one of internal image files and external image files, the another contents display area being displayed adjacent to the contents display area and displaying a greater number of thumbnail images than are displayed in the contents display area, and sizes of the thumbnail images in the contents display area being different from sizes of the thumbnail images in the another contents display area; and
controlling display (iv) in the single window, of a slide operation unit to adjust the sizes of both the thumbnail images displayed in the contents display area and the thumbnail images displayed in the another contents display area by a slide operation,
wherein both internal directory listing and external directory listing continue to be displayed while the thumbnail images are displayed in the contents display area.

31. A non-transitory computer-readable storage medium including computer executable instructions, wherein the instructions, when executed by a computer, cause the computer to perform a method, the method comprising:
storing internal image files;
communicating with an external server separated from the computer by a network, the external server having external image files which are uploaded by a user and stored therein and realizing an image storing service;
retrieving internal directory information for the internal image files and external directory information for the external image files;
controlling display of a directory display area, a contents display area, and another contents display area in a single window;
controlling display (i) in the directory display area, of both an internal directory listing corresponding to the internal directory information for the internal image files and an external directory listing corresponding to the external directory information for the external image files, and (ii) in the contents display area, thumbnail images corresponding to either internal image files or external image files in accordance with user selection of the internal or external directory listing in the directory display area;

controlling display (iii) in the another contents display area, of thumbnail images corresponding to one of internal image files and external image files, the another contents display area being displayed adjacent to the contents display area and displaying a greater number of thumbnail images than are displayed in the contents display area, and sizes of the thumbnail images in the contents display area being different from sizes of the thumbnail images in the another contents display area; and controlling display (iv) in the single window, of a slide operation unit to adjust the sizes of both the thumbnail images displayed in the contents display area and the thumbnail images displayed in the another contents display area by a slide operation, wherein both internal directory listing and external directory listing continue to be displayed while the thumbnail images are displayed in the contents display area.

\* \* \* \* \*